United States Patent [19]

Maddern et al.

[11] Patent Number: 5,610,928
[45] Date of Patent: Mar. 11, 1997

[54] DATA VERIFICATION METHOD

[75] Inventors: Thomas S. Maddern; James K. Saunders, both of Dorset, United Kingdom

[73] Assignee: GPT Limited, United Kingdom

[21] Appl. No.: 674,331

[22] Filed: Jul. 1, 1996

Related U.S. Application Data

[63] Continuation of Ser. No. 242,771, May 16, 1994, abandoned.

[30] Foreign Application Priority Data

May 28, 1993 [GB] United Kingdom ............ 9311106

[51] Int. Cl.$^6$ .................................. G06F 11/10
[52] U.S. Cl. ........................... 371/37.1; 370/244
[58] Field of Search ................... 371/37.1, 37.7, 371/53, 68.2; 370/13, 14, 60, 60.1, 94.1, 16

[56] References Cited

U.S. PATENT DOCUMENTS

| | | | |
|---|---|---|---|
| Re. 33,900 | 4/1992 | Howson | 371/37.7 |
| 4,300,230 | 11/1981 | Philip et al. | 370/13 |
| 4,535,442 | 8/1985 | Maddern et al. | 370/13 |
| 4,965,788 | 10/1990 | Newman | 370/60 |
| 5,247,516 | 9/1993 | Bernstein et al. | 370/60 |
| 5,271,000 | 12/1993 | Engbersen | 370/13 |
| 5,311,509 | 5/1994 | Heddes et al. | 370/60 |
| 5,426,654 | 6/1995 | Hayashi et al. | 371/37.1 |

FOREIGN PATENT DOCUMENTS 2120041  11/1983  United Kingdom.
2202412   9/1988  United Kingdom.

OTHER PUBLICATIONS

IEEE Journal on Selected Areas in Communications, vol. 7, No. 7, Sep. 1989, pp. 1091–1103, Ahmadi et al.

Primary Examiner—Roy N. Envall, Jr.
Assistant Examiner—Steven R. Garland
Attorney, Agent, or Firm—Kirschstein et al.

[57] ABSTRACT

In a telecommunications duplicated synchronous switch where switching in bit synchronism is carried out and fault detection is by discrepancy checking between the duplicate switch planes, determination of the faulty plane is provided by the data being carried in switched bytes grouped into data frames, each frame carrying check data in respect of data from an earlier frame. Corruption of data in a frame is thus indicated by information in a later frame.

4 Claims, 6 Drawing Sheets

Fig.2A

| FRAME No. | DATA BITS 012345678 | CHECK BIT |
|---|---|---|
| 0 | 012345678 | P (bit 0's) |
| 1 | 012345678 | P (bit 1's) |
| 2 | 012345678 | P (bit 2's) |
| 3 | 012345678 | P (bit 3's) |
| 4 | 012345678 | P (bit 4's) |
| 5 | 012345678 | P (bit 5's) |
| 6 | 012345678 | P (bit 6's) |
| 7 | 012345678 | P (bit 7's) |
| 8 | 012345678 | P (bit 8's) |
| 9 | 012345678 | P (bit 0's) |
| 10 | 012345678 | P (bit 1's) |
| 11 | 012345678 | P (bit 2's) |
| 12 | 012345678 | P (bit 3's) |
| 13 | 012345678 | P (bit 4's) |
| 14 | 012345678 | P (bit 5's) |
| 15 | 012345678 | P (bit 6's) |
| 16 | 012345678 | P (bit 7's) |
| 17 | 012345678 | P (bit 8's) |

MULTI-FRAME n (frames 0–8), MULTI-FRAME n+1 (frames 9–17)

PARITY MULTI-FRAME n-1 (frames 0–8), PARITY MULTI-FRAME n (frames 9–17)

Fig.2B

| FRAME No. | DATA BITS 012345678 | CHECK BIT |
|---|---|---|
| 0 | 012345678 | C1 |
| 1 | 012345678 | C2 |
| 2 | 012345678 | C3 |
| 3 | 012345678 | C4 |
| 4 | 012345678 | C1 |
| 5 | 012345678 | C2 |
| 6 | 012345678 | C3 |
| 7 | 012345678 | C4 |

MULTI-FRAME n (frames 0–3), MULTI-FRAME n+1 (frames 4–7)

CRC MULTI-FRAME n-1 (frames 0–3), CRC MULTI-FRAME n (frames 4–7)

Fig.2C

| FRAME No. | DATA BITS 0 1 2 3 4 5 6 7 8 | CHECK BIT |
|---|---|---|
| 0 | 012345678 | A |
| 1 | 012345678 | A |
| 2 | 012345678 | A |
| 3 | 012345678 | A |
| 4 | 012345678 | A |
| 5 | 012345678 | A |
| 6 | 012345678 | A |
| 7 | 012345678 | A |
| 8 | 012345678 | A |
| 9 | 012345678 | A |
| 10 | 012345678 | A |
| 11 | 012345678 | A |
| 12 | 012345678 | A |
| 13 | 012345678 | A |
| 14 | 012345678 | A |
| 15 | 012345678 | A |
| 16 | 012345678 | A |
| 17 | 012345678 | A |
| 18 | 012345678 | A |
| 19 | 012345678 | A |
| 20 | 012345678 | A |
| 21 | 012345678 | A |
| 22 | 012345678 | P (bit 0's) |
| 23 | 012345678 | P (bit 1's) |
| 24 | 012345678 | P (bit 2's) |
| 25 | 012345678 | P (bit 3's) |
| 26 | 012345678 | P (bit 4's) |
| 27 | 012345678 | P (bit 5's) |
| 28 | 012345678 | P (bit 6's) |
| 29 | 012345678 | P (bit 7's) |
| 30 | 012345678 | P (bit 8's) |

MULTI-FRAME n

Frames 0–9: INPUT PORT ADDRESS
Frames 10–21: INPUT CHANNEL ADDRESS
Frames 22–30: PARITY MULTI-FRAME n-1

Fig.3.

| TWO PLANE WORKING IN OPERATION? ||
|---|---|
| Y<br>SELECT PLANE TO USE<br>(Fig.4) | N |
| HANDLE CHECK BITS FOR SELECTED PLANE<br>(Fig.6) ||

Fig.4.

| DISCREPANCY ALREADY DETECTED IN MULTI-FRAME? |||
|---|---|---|
| Y | N<br>CURRENT BYTES DISCREPANT? ||
| SELECT GOOD PLANE | Y<br>SET DISCREPANCY<br>DETECTED IN MF | N<br>RESET DISCREPANCY<br>DETECTED IN MF |
| | SELECT GOOD<br>PLANE (Fig.5) | SELECT PLANE A |

Fig.5.

| VALIDATE CHECK BIT FOR PLANE A (ADDRESS OR PARITY BASED ON MF COUNTER) |||||
|---|---|---|---|---|
| CHECK BIT CORRECT? |||||
| Y<br>VALIDATE FOR PLANE B |||| N<br>REPORT A FAULTY |
| CHECK BIT CORRECT? |||| LOCK TO PLANE B |
| Y<br>END OF MULTI-FRAME ||| N<br>REPORT B FAULTY | |
| Y<br>UNDETECTED ERROR REPORT | N || LOCK TO PLANE A | |
| SELECT PLANE A |||| |

Fig.6.

| IS CONNECTION CHANGING? |||||||
|---|---|---|---|---|---|---|
| N<br>CHECK BIT AS EXPECTED? ||| Y<br>FORMING NEW ADDRESS? ||||
| N<br>SET CONNECTION CHANGING | Y || Y<br>ADD BIT TO STORED ADDRESS || N<br>END OF MULTI-FRAME ||
| CALCULATE ONGOING PARITY ||| CALCULATE ONGOING PARITY || Y<br>SET FORMING NEW ADDRESS | N |
| END OF MULTI-FRAME? ||| END OF MF? || | |
| Y<br>STORE PARITY || N | Y<br>REPORT NEW CONNECTION | N | | |
| ||| RESET FLAGS | | | |

DATA VERIFICATION METHOD

This is a continuation of application No. 08/242,771 filed May 16, 1994, now abandoned.

BACKGROUND OF THE INVENTION

Problems are experienced with the operation of a telecommunications duplicated synchronous switch where switching in bit synchronism is carried out and fault detection is carried out by discrepancy checking between the duplicate switch planes. The detection of the existence of a fault is relatively simple, but the determination of which plane is faulty is more problematical.

Use of a simple priority bit per switch plane replica only allows partial identification of the faulty switching plane.

SUMMARY OF THE INVENTION

According to the present invention there is provided a telecommunications switch fabric, wherein the data is carded in switched bytes grouped into data frames, wherein each frame carries check data in respect of data from an earlier frame.

BRIEF DESCRIPTION OF THE DRAWINGS

The present invention will now be described by way of example, with reference to the attached drawings, in which;

FIGS. 2A, 2B and 2C show examples of multi-frame formats for use in the present invention;

FIGS. 3 to 6 show an example of a Dual Plane Checking Algorithm for use in the present invention.

DESCRIPTION OF THE PREFERRED EMBODIMENTS

Figure 1:
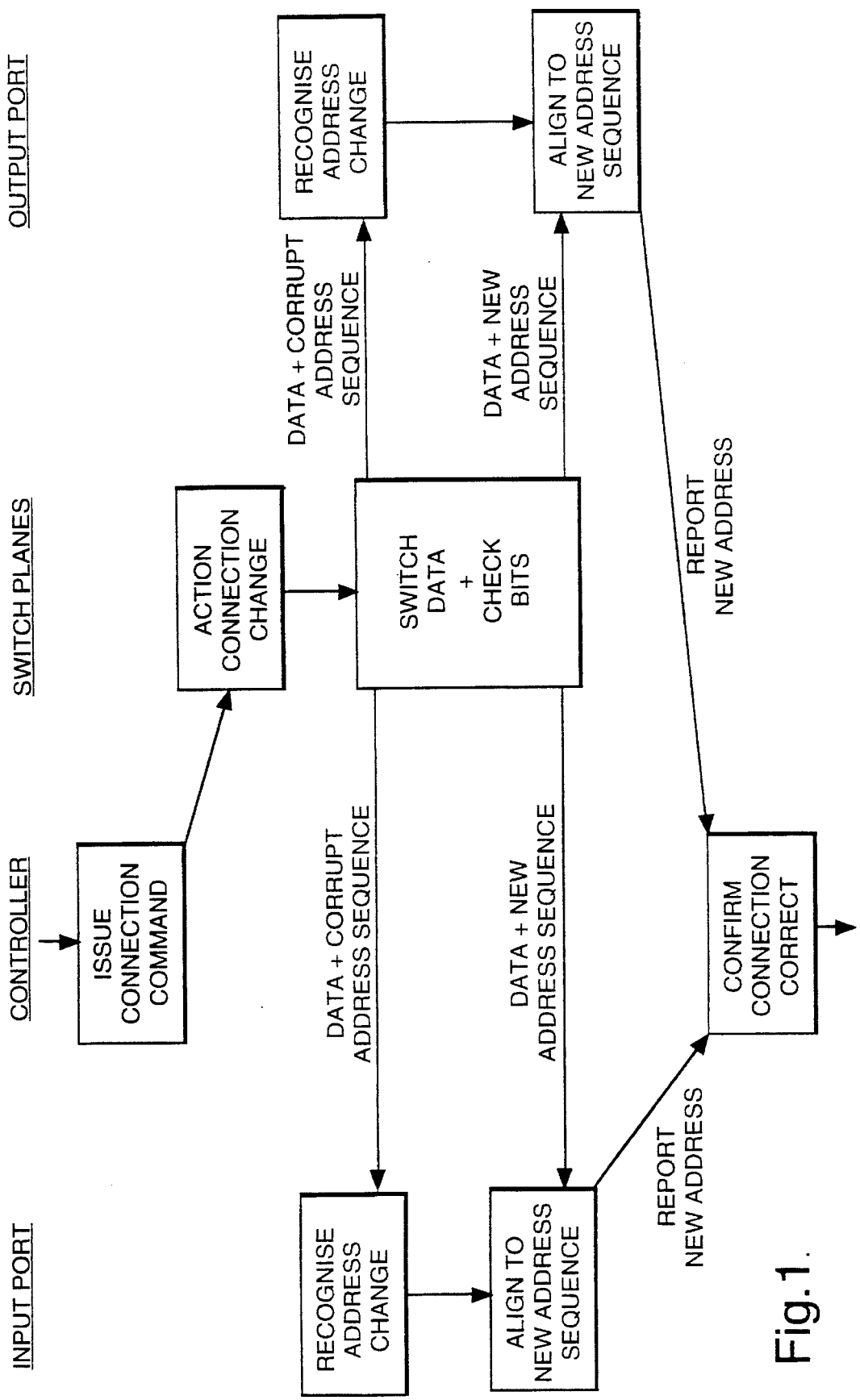
FIG. 1 is a diagrammatic representation of a basic message sequence for carrying out the present invention.

It is proposed that switch maintenance be carried out using switch check and address data calculated including at least a part of a previous data frame possibly in conjunction with discrepancy checking between duplicate planes. Furthermore it is proposed that the introduction of errors in the data frames when connections are changed can be used to a) confirm the changed connection and b) to check routinely error detection mechanisms during normal operation.

This is achieved by using an additional bit per byte switched. This bit is encoded over a data frame with the input channel address and a parity or CRC check on the previous data frame. Any data corruption or misrouting will be detected by discrepancy failure between switch planes. Subsequent failure of the check bit in the multi-frame will isolate the fault to one plane.

When a connection is changed the data frame sequence will be disturbed and so the output port will recognise the connection change. In this case there will be no discrepancy failure between switch planes. By having the input address encoded in the switched data the output port can report to which input port it is connected. This would allow each new connection to be confirmed by both switch replicas before being used.

This technique exercises the in essence fault detection mechanism every time a connection is changed and allows each new connection to be path checked and confirmed before use. This happens automatically when a connection is changed without any additional control.

In addition all switch plane faults in a duplicated switch are isolated to a plane within a data frame time period.

Before considering the present invention some ideas for maintenance of synchronous switch planes in a duplicated mode are discussed. It is assumed that the two switch planes are run in bit synchronism and that a fault can be detected by discrepancy checking.

The problem is that having detected a fault between duplicated planes by discrepancy checking it must be isolated to the right plane. This requires either extra bandwidth across the planes for checking or choosing a plane arbitrarily and running diagnostics on it.

Firstly considering using extra bandwidth.

Broadly speaking switch plane faults are either;

data store faults with corrupt data, control store faults which cause misrouting, interconnect faults with corrupt data.

Generally for a 64 kb/s switch 8-bit bytes need to be switched. To allow for parallel switching of Corrupt Address Sequence (CAS) a ninth bit per byte is required. Therefore to allow for extra bandwidth for "through" channel signalling or maintenance at least 10-bit 'bytes' need to be switched.

Further discussion will be confined to '10-bit switches'. It is accepted that for a duplicated switch unless extra delay is introduced errors from a switch plane may be introduced to line whilst a fault is isolated. For British Telecommunications (BT) Synchronous Digital Hierarchy (SDH) equipment if the isolation time is less than 10 ms this error would not need to be included in availability calculations. The only simple way to avoid this delay is triplicated switch planes.

The simplest maintenance option is where there is simple parity per byte.

In this case the 10th bit is used as a simple parity bit for the other 9 bits in the byte.

It will detect single bit data corruption on interconnect or data stores. Multiple bit corruptions may be missed.

It will not detect routing faults as the mis-routed data will have valid parity.

However in a bit-spread architecture where each bit is switched separately muting errors will be detected as a fault is likely to affect only 1 bit. This would not be true in smaller growth stages of bit spread architectures as they require more than one bit to be switched in the same switch device. This is also not a very future proof option as more integration in the future may put a number of bit switches in the same device.

Using simple parity like this means that output ports will not see any changes if connections are changed.

Using more than 10-bits may make possible more complex parity to detect multiple bit faults but still suffers from the failure to detect mis-routing.

Assuming the fault is detected the fault detection/isolation time is one byte period.

A second option is checking over multi-frames.

In this scheme the switched bytes are grouped into multi-frames with each multiframe carrying the check data of the previous multi-frame. There are a number of options for this as described below.

The obvious problem with this approach is that when a connection is changed the multi-frame will be broken and cause an error to be detected. However when this happens there should not be any discrepancy detected between the planes.

This situation could be ignored at the output port. However if it is ignored the output port can lock to the wrong plane if a switch command is only applied to one plane due to a fault. In this case the plane with the new correct connection would show a fault and there would be discrepancies.

Therefore any failure of the multi-frame check detected must be reported to the controller. This can be used to confirm to the controller that the connection has changed and/or a fault has been detected.

This means that for every connection change the switch plane fault detection mechanism is exercised.

If when a connection change is made it is only implemented on one plane then there will be a discrepancy between the planes and a fault detected on the actual good plane. When this is reported to the control system it should recognise that the connection has not been made on both planes and hence that the plane where the connection was not changed and which has been reported good is in fact bad.

For single plane working with all errors reported the control system would need to decide if it was a genuine error or a connection change.

Consider the case of a 1-byte multi-frame where a byte could carry the parity of the previous byte. This is not that much better than the simple parity described above but gives a 50% chance of detecting routing faults if the first byte of the mis-routed data has a different parity. The use of more parity bits here would possibly help.

For detected faults the detection time would be 1 frame of 125 microseconds.

For an x-byte multi-frame a byte carries the parity of a byte x-bytes previous. This has the same problems with multiple bit data errors as the simple scheme but depending on the size of 'x' is more likely to detect routing faults.

However if the data pattern being switched is constant, i.e. all 0's, all '1's or idle then misrouting could switch in an identical pattern which would he detected.

For detected faults the detection time is up to 125× microseconds.

In longitudinal parity over an 9-byte multi-frame the parity bit in byte 0 is for all the bit 'O's in the previous multi-frame, the bit in byte 1 for all the bit '1' etc.

This scheme now starts to address multiple bit errors and ntis-routing faults. could still fail for misrouting of a constant bit pattern.

Time to detect a fault is up to 2×1.125 ms i.e. 2.25 ms.

A variation on this is to generate parity diagonally across the data of a multi-frame e.g. bit 0 byte 0, with bit 1 byte 1 etc.

Instead of using parity over a multi-frame a CRC check could he generated over the whole multi-frame data. Them is obviously a trade-off between fault detection time and fault coverage. A CRC4 check could be carried out with a four byte multi-frame.

This detects multiple bit errors and routing errors. Again however it could miss routing errors involving constant bit patterns.

Fault detection time is up to 8 frames i.e. 1 ms.

All the multi-frame data checking described above can fail to detect mis-routing of constant bit pattern data. One way of detecting this would he to use the check-bit with each byte to carry the input channel address over a multi-frame.

For a 1024 port STM-1 switch with up to 2048 channels per port 21 bits are required to define the address. Any mis-routing would corrupt this address multi-frame. The checking process, once it has locked to an address would expect that address to be the same in subsequent multi-frames.

The same principle of reporting errors on change of connection can still be applied to confirm change of connections. This avoids the need to inform an output port of the correct input address to receive. Additionally the output port can confirm exactly what input channel it is connected to.

This approach would detect all routing faults but would not detect data corruptions.

Fault detection time is up to 2×21 frames i.e. 5.25 ms.

If the multi-frame data checks described above are used with the address check then mis-routing and data corruption faults will be detected.

Two check bits, one for address checking and one for data could be used but this requires 11-bit switching. Alternatively a longer multi-frame could be used to multiplex both types of check bit in the check bit.

The multi-frame address plus longitudinal parity requires a 30 byte multi-frame. Fault detection time is up to 2×30 frames i.e. 7.5 ms.

FIG. 2 shows the possible format of a multi-frame.

The multi-frame can obviously be shorter for smaller switches which would reduce detection times. Also a CRC code could be encoded with the address. This would reduce the multi-frame but give less diagnostics in the event of a fault, i.e. it would not be clear if the fault was data corruption or mis-routing.

In all the proposals for multi-frame use it is assumed that all ports start on a synchronous boundary. If not some form of alignment signal would be required.

FIGS. 3 to 6 show an illustration of an algorithm for carrying out the procedure described above.

For a synchronous switch fabric the use of an extra bit per byte coded as a multi-frame address plus check digits for the previous multi-frame gives comprehensive maintenance of the switch in duplicated mode.

This approach gives the following advantages;

a) all faults are isolated to a switch plane within 7.5 ms (this may be less if a smaller address range is used). For SDH switches with shorter frame times the detection times will be within 840 microseconds, b) change of connection is confirmed by the output port not just by the switch device, c) a confirmation of connection can verify the correct connections, d) normal operation exercises the fault detection mechanism, e) a change of connection only applies control changes to the switch matrix not the incoming and outgoing ports.

However in order to meet reliability figures any duplicated switch will require to maintain partial planes in service after having detected a fault. This will necessitate additional checks to isolate the faulty area of a plane.

In order to implement this technique data storage will be required on a per channel basis at each port to the switch where the planes come together; The storage required per channel is:

| | |
|---|---|
| For connection address: | 21 bits |
| For previous frame parity: | 9 bits |
| For calculating current output parity: | 9 bits |
| Flag bits: | 5 bits |
| Current bytes: | 20 bits |
| Total per channel | 64 bits. |

N.B. If CRC used then more bits may be needed.

For a 2048 channel interface 131072 (128 k) bits of storage are required.

For the same bandwidth SDH interface with a reduced switching frame and only channels only 17280 bits are required.

Obviously the 2048 channel interface could consist of a number of switch input streams mixed together. In this case the storage required at each port would be proportionately reduced.

The control bandwidth to and from a switching using the proposed maintenance strategy is determined by the switch request rate required for the switch.

The most onerous requirement on a switch will be for a PSTN switch. The request rate is determined by the Busy Hour Call Attempts (BHCA) rate for the exchange and the number of switch requests per call determined by the exchange architecture. The exchange architecture is important because if the switch is used to connect tones etc. to subscribers the number of switch requests per call will be much higher than if these are done in remote units nearer the subscriber interface.

The minimum set of switch requests per PSTN call are:

allocate forward speech path, complete duplex speech path, clear forward path, clear reverse path.

Technically the clears are not necessary as connects can be overridden but it is generally safer to clear connections positively. Also the clears could be done with one command but if kept separate all commands to the switch can be for uni-directional connections.

If connections are always uni-directional then using the proposed maintenance technique there should always be one response per switch change.

A BHCA of 2.1 million gives a call rate of approx 600 calls/second. This would give a switch update rate of 2400 per second.

Assuming 30 bits of data to change a switch connection the required bandwidth from control to the switch is 2400× 30 bits/sec=72 kb/s.

Assuming 64 bit messages from the switch ports back to the controller the required bandwidth is 2400×64=153600 bits/sec.

The control bandwidth required to/from a port is not onerous. Switches based around STM-1 ports will have 155 Mb/s interfaces to switches. A 10 Mb/s interface to each port for control is only 1/16 of this bandwidth.

The problem is how to control funnelling of messages from each of up to 1024 ports when in a one second period all 2400 could come from one port.

Figure 7:
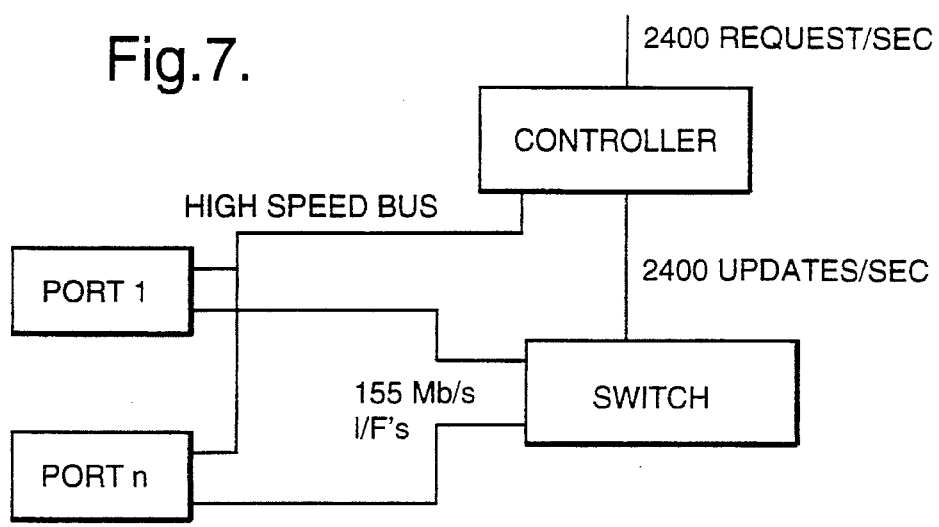
FIGS. 7 to 9 show block diagrams of various examples of options for control of port access.
Figure 8:
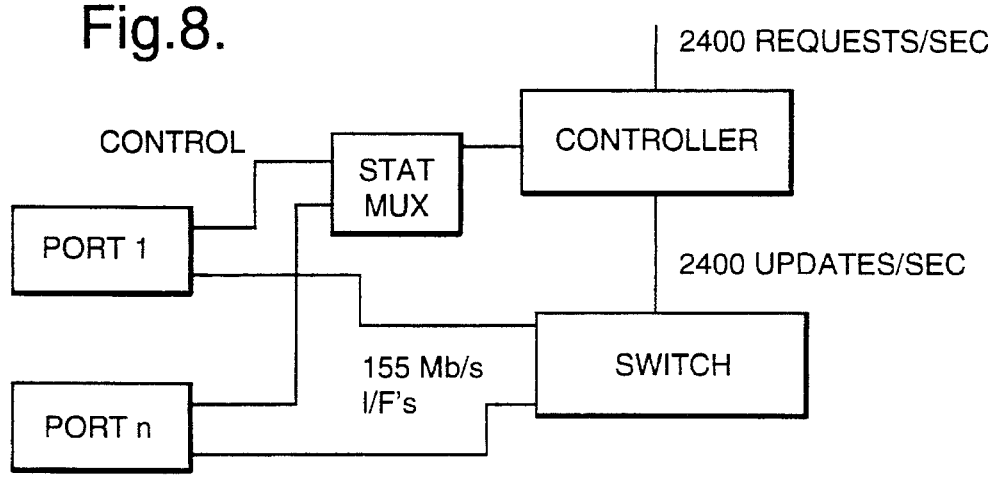

Options for this are;

a high speed bus at say 10 Mb/s as shown in FIG. 7. The bus protocol would take care of contention between ports.

direct links to each port statistically mixed onto links to the controller as shown in FIG. 8. The control paths can be mixed in with traffic paths to save cabling.

Figure 9:
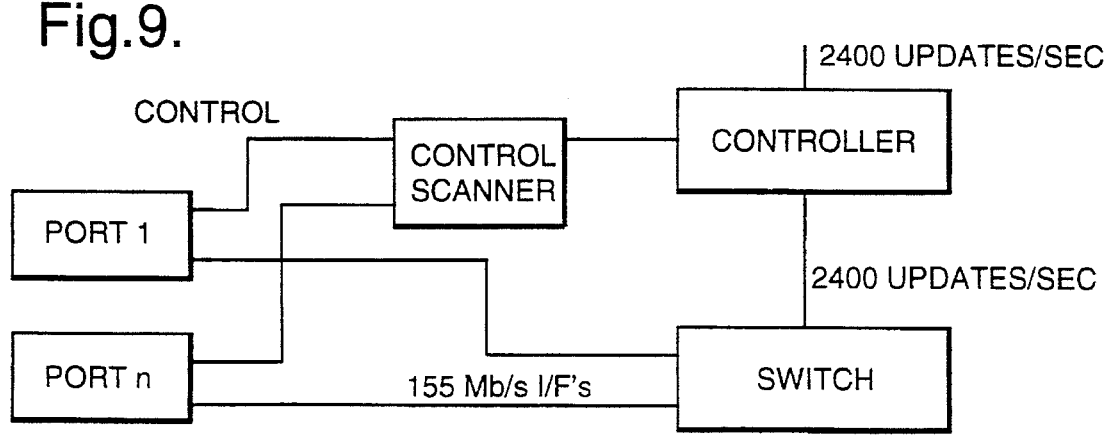

It may be necessary to use a nested level of statistical muxes.

direct links to each port as shown in FIG. 9. Each link being cyclically scanned by a controller. When a port has infomarion the controller would lock onto the link until it had received the message. Again the links can be muxed in with traffic paths. The polling time would obviously use some of the time required for dealing with the messages.

All of these options would need considering if the maintenance technique is applied to a specific architecture. Different options will be more appropriate to different architectures and switch size.

Processing 2400 requests per second is 1 every 416 μsec. Assuming any control processor used 50% capacity on switch requests it must allocate 208 μsec of processing per switch request. This is about 1664 instructions at 8 Mips.

We claim:

1. A method of verifying data carried in switched bytes by a telecommunications switch fabric, comprising the steps of: grouping the bytes carried by a telecommunications switch fabric into data frames, inserting check data into each data frame in respect of data from a frame transmitted earlier than the current frame and subsequently verifying the data of the current frame using the check data for the current frame when that check data is received with a subsequent frame.

2. The method as claimed in claim 1, wherein each frame further carries address data from a frame earlier than the current frame.

3. The method as claimed in claim 1, wherein each frame carries check data in respect of a part of the earlier frame and a part of the current frame.

4. The method as claimed in claim 1, wherein duplicate data frames are carried on duplicate switch planes within the switch fabric.

* * * * *